(12) United States Patent
Magdziarz

(10) Patent No.: US 11,886,802 B2
(45) Date of Patent: Jan. 30, 2024

(54) ADAPTIVE AUTOFILL SYSTEMS AND METHODS

(71) Applicant: BOLD Limited, Hamilton (BM)

(72) Inventor: John Magdziarz, Orinda, CA (US)

(73) Assignee: BOLD Limited, Hamilton (BM)

(*) Notice: Subject to any disclaimer, the term of this patent is extended or adjusted under 35 U.S.C. 154(b) by 258 days.

(21) Appl. No.: 16/683,004

(22) Filed: Nov. 13, 2019

(65) Prior Publication Data

US 2020/0159821 A1 May 21, 2020

Related U.S. Application Data

(60) Provisional application No. 62/768,360, filed on Nov. 16, 2018.

(51) Int. Cl.
| | |
|---|---|
| *G06F 17/00* | (2019.01) |
| *G06F 40/174* | (2020.01) |
| *G06F 16/338* | (2019.01) |
| *G06F 16/335* | (2019.01) |
| *G06F 40/205* | (2020.01) |
| *G06F 40/258* | (2020.01) |

(52) U.S. Cl.
CPC .......... *G06F 40/174* (2020.01); *G06F 16/337* (2019.01); *G06F 16/338* (2019.01); *G06F 40/205* (2020.01); *G06F 40/258* (2020.01)

(58) Field of Classification Search
CPC ...... G06F 40/174; G06F 16/28; G06F 16/337; G06F 40/205; G06F 16/951; G06F 16/335; G06F 16/24578; G06F 16/3344; G06F 16/36; G06F 40/284; G06F 40/103; G06F 40/30; G06F 16/93; G06F 16/95; G06F 8/42; G06F 8/427; G06F 16/338; G06F 40/258; H04L 67/22; G10L 15/1822; G10L 13/08

See application file for complete search history.

(56) References Cited

U.S. PATENT DOCUMENTS

| | | | | |
|---|---|---|---|---|
| 7,206,998 B2* | 4/2007 | Pennell | .............. | G06Q 30/0633 |
| | | | | 715/224 |
| 11,120,512 B1* | 9/2021 | Dutt | ...................... | G06F 40/186 |
| 2005/0257148 A1* | 11/2005 | Goodman | ............. | G06F 40/174 |
| | | | | 715/226 |
| 2006/0224397 A1* | 10/2006 | Morris | ................. | G06Q 10/067 |
| | | | | 235/375 |
| 2009/0183063 A1* | 7/2009 | Malkin | .................. | G06Q 10/06 |
| | | | | 718/100 |
| 2017/0169126 A1* | 6/2017 | Wang | ...................... | H04L 29/08 |
| 2017/0277774 A1* | 9/2017 | Eigner | ............... | G06Q 30/0204 |

* cited by examiner

*Primary Examiner* — Michael Ortiz-Sanchez
(74) *Attorney, Agent, or Firm* — Dinsmore & Shohl LLP

(57) ABSTRACT

The disclosed invention provides improved systems and methods for auto-filling electronic forms, which involves presenting a user with an electronic form comprising one or more fields, each field having one or more field attributes, parsing the electronic form to generate a form mapping, including a form path identifier identifying a location from where the electronic form originated, and a global field identifier and corresponding label for each of the one or more fields. The document mapping may be sent to a remote server, which may provide user data in response, which may be used to automatically populate the electronic form.

17 Claims, 7 Drawing Sheets

ADAPTIVE AUTOFILL SYSTEMS AND METHODS

BACKGROUND OF THE INVENTION

Field of the Invention

This disclosure generally relates to systems and methods for automating completion of computer based forms.

Background

People engage in countless activities online many of which require users to enter and submit information electronically, for example, through an electronic form on a website or using an application on their mobile device. A person applying for a job, for instance, may be required to fill out a job application or questionnaire provided on a company's website or via a job portal. But people seeking jobs often apply to multiple positions at one or more companies, requiring the repeated entry of the same or similar information for each job application. The tedious, time-consuming nature of the application process operates as a barrier to those seeking jobs.

To aid in this process, tools have been developed to automatically populate (or auto-fill) electronic forms based on inputs provided by users when completing other forms. Existing tools, however, have rather limited capabilities and are prone to inaccurate results. Existing tools, for instance, are static in nature and are only capable of handling a limited number of pre-defined fields, like, 'name' and 'address', and even then, they yield less than satisfactory results because of the manner in which they are implemented. These tools, for example, typically rely on the label associated with a particular field to intuit the information being requested (e.g., a determination may be made that a field is requesting the user's name based on a label of "Please enter your name"). But the association between a label and a field may not be readily apparent (e.g., due to the often time complex structure of the electronic form in underlying code) and there may be countless ways in which certain information may be requested (e.g., there are over 25 different ways in which a user can be prompted to enter their e-mail address), making it difficult to include logic that accounts for all possible situations. As a consequence, existing auto-fill tools usually are only able to partially auto-fill an electronic form and even then are prone to inaccurate results, and thus are of limited utility to users.

Traditional auto-fill solutions are also limited in the input types that they are able to handle, typically only auto-filling text fields within a form. But non-text fields (e.g., radio buttons, dropdown lists, etc.) constitute roughly half of the input fields encountered in electronic forms. The inability to handle non-text field types further limits the effectiveness of such tools. Another significant limitation of traditional auto-fill tools stems from the fact that they operate in a localized manner on each device of a user. It is not uncommon for users to make use of several different devices (e.g., a computer, mobile device), but given the localized nature of the auto-fill processing, users are unable to leverage the data entered on one device to facilitate auto-fill on another.

SUMMARY

The presently disclosed FillBot system seeks to address the above-mentioned limitations of existing auto-fill techniques by employing a data-centric approach, which leverages user entered data to determine what information is being requested in an electronic form. More particularly, the FillBot system looks at the actual data entered by a user along with information about the input field (e.g., its associated label, expected data type, etc.) to identify a correspondence, across different electronic forms, between input fields requesting the same information. By moving away from a solely field-label approach and focusing on the data actually entered by a user, the FillBot system is able to more completely and accurately determine what information is being requested in a particular input field. Furthermore, in contrast to traditional auto-fill systems, the FillBot system is implemented in a distributed manner where a backend server processes and stores user data and form information, making a user's data portable (i.e., across any and all user devices) and providing improved accuracy and efficiency by allowing users to take advantage of relationships identified by the FillBot system based on the activity of other users.

In a first embodiment, FillBot is enabled by the capabilities of, and executed in the context of, a browser. The FillBot browser extension makes use of the browser's document object model (DOM) when parsing electronic forms, as well as a backend server, which stores user data and implements the relationship mapping algorithms, through an application programming interface (API) service running on the backend server.

In a second embodiment, FillBot is enabled by the capabilities of, and executed in the context of, a native mobile application. The FillBot application makes use of the operating system DOM when parsing electronic forms, as well as a backend server, which stores user data and implements the relationship mapping algorithms, through an application programming interface (API) service running on the backend server.

BRIEF DESCRIPTION OF THE DRAWINGS

The accompanying drawings, which are incorporated herein and form part of the specification, illustrate one or more aspects of the present invention and, together with the description, further serve to explain the principles of the invention and to enable a person skilled in the relevant art(s) to make and use the invention.

The features and advantages of the disclosed embodiments will become more apparent from the detailed description set forth below when taken in conjunction with the drawings, in which like reference characters identify corresponding elements throughout. In the drawings, like refer-

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment," "an embodiment," "an example embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Figure 1:
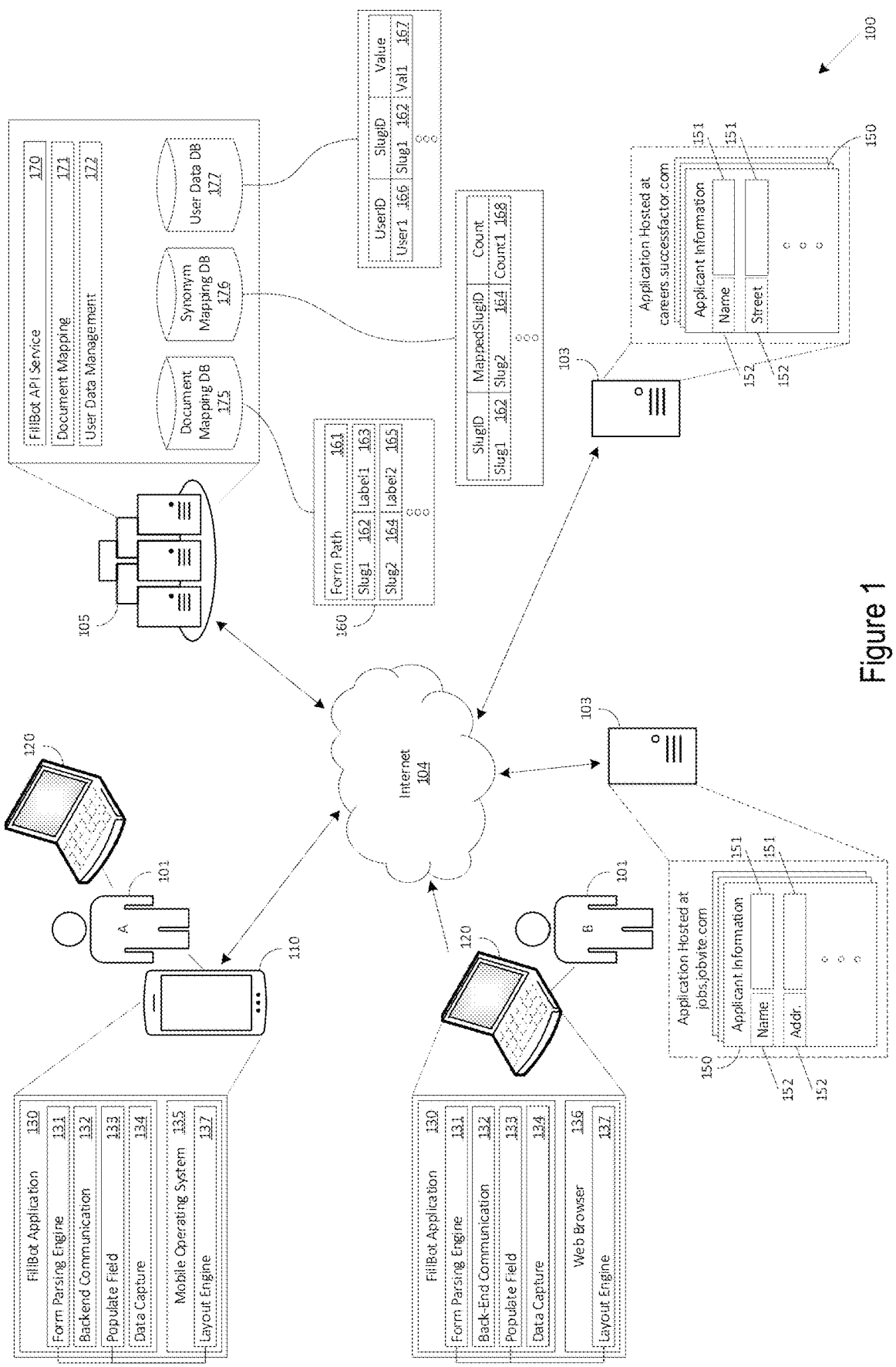
FIG. 1 illustrates an exemplary environment in which the auto-fill techniques of the present invention may be used.

FIG. 1 illustrates an exemplary environment 100 in which the auto-fill techniques of the present invention may be used. As illustrated, different users 101 (e.g., User A and User B) may use one or more devices (e.g., mobile phone 110 or personal computer 120) to communicate with corporate web servers 103 and backend server 105 over the Internet 104. For example, users 101 may navigate to and interact with websites hosted on one or more corporate web servers 103. Corporate web servers 103, for example, may host the recruiting or career site for a particular company (e.g., using commercially available applicant tracking systems (ATS)) through which a user may apply for one or more open positions within the company. In applying for a particular opening, a user may be presented with an electronic form 150 requesting the user to enter information into different fields 151 throughout the form, where each field 151 has a corresponding label 152 indicating what information the user should enter into the field 151. The electronic form 150, for example, may be presented to users 101 as an online form (e.g., a dynamic HTML web page or the like). In other instances, the electronic form 150 may be a discrete document (e.g., a fillable Adobe PDF document, Microsoft Word document, or the like). A user may utilize the FillBot application 130 of their user device to automatically populate the fields 151 with previously captured user information and/or manually enter data into the fields 151 using an input device of the user device (e.g., a keyboard, touchscreen, etc.). The FillBot Application As mentioned above, the FillBot application 130 may be provided as a browser extension (e.g., on the personal computer 120 of a user 101) or as a native mobile application (e.g., on the mobile phone 110 of a user 101). The FillBot application 130 may operate similarly in both contexts, and may include a form parsing engine 131, a backend communication component 132, a populate field component 133, and a data capture component 134, as well as a blacklist tool.

The form parsing engine 131 may be responsible for scanning an electronic form 150 and generating a document mapping 160 containing a listing of all the information being requested in the electronic form 150, and may utilize the DOM generated by the layout engine 137 of the mobile operating system 135 or web browser 136 in order to do so. As noted above, the electronic form 150 may be presented to users 101 as an online form (e.g., a dynamic HTML web page or the like). In other instances, the electronic form 150 may be a discrete document (e.g., a fillable Adobe PDF document, Microsoft Word document, or the like). In some embodiments, the FillBot application 130 may be able to ingest existing electronic forms 150 that contain user entered data (e.g., a structured document containing user entered data corresponding to particular fields), which may be used to initialize the user data database 177 of the backend server 105 for use in auto-filling subsequent electronic forms 150, as described in further detail below.

The document mapping 160 that is generated may include a form path identifier 161, which identifies the website and form to which the document mapping 160 corresponds. The form path identifier 161 may be generated by the form parsing engine 131 by parsing the website URL on which the electronic form 150 was detected, and may be represented using an X-path like addressing scheme (e.g., 'jobs.jobvite.com'). The document mapping 160 may also include one or more data pairs that describe the different input fields 151 in the electronic form 150. The document mapping 160, for example, may include a unique field identifier, or SlugID, and a corresponding label, which may be generated by the form parsing engine 131.

The form processing engine 131 may generate the SlugID for each input field 151 based on different attributes of the input field 151, for example, its input ID, label, and input type. The input ID and label, for example, may be the value of the id and label attributes for an HTML input element. And in instances where the id attribute is undefined (i.e., having a null value, or comprising an empty string), the input ID may be treated as an aggregation of (e.g., the sum of the values of) some or all of the HTML attributes of the input element. Input type, likewise, may reflect the field type of the HTML input element (e.g., radio, checkbox, etc.). More generally, the SlugID may be generated such that it identifies a particular input field 151 on a specific electronic form 150 as well as preserves necessary information regarding the particular input field 151. In this way, the SlugID can be used to associate a specific input value provided by a user to the input field 151 in which the value was entered, and the FillBot application 130 may be able to accurately identify and fill each input field 151.

In cases where the electronic form 150 includes multiple input fields having the same label and type, the form processing engine 131 may also consider the sequential number of the input field 151, allowing the FillBot application 130 to accurately fill seemingly duplicate input fields 151. An electronic form 150, for example, may include multiple "Street Address" input fields (e.g., referring to a work and home address), and the form processing engine 131 may generate unique SlugIDs for each of them (e.g., "street-address-1" and "street-address-2"). The FillBot application 130, thus, may be able to disambiguate each of the input fields 151 as well as the values entered by the user into each.

The backend communication component 132 allows the FillBot application 130 to interface with the backend server 105 through one or more endpoints provided by the FillBot API service 170. The backend communication component 132, for example, may transmit the document mapping 160 generated by the form parsing engine 131 to the backend server 105 for processing (e.g., through an HTTP PUT or POST method call). The FillBot application 130 may also include a data capture component 134 that may capture data entered by the user into the electronic form 150, which the backend communication component 132 may transmit to the backend server 105 for processing (e.g., through an HTTP PUT or POST method call). The backend communication component 132 may also receive user data from the backend server 105 in response. The populate field component 133 of the FillBot application 130 may use the provided user data to automatically populate the input fields 151 of the electronic form 150, and may utilize the DOM generated by the layout engine 137 in order to do so (i.e., to actually manipulate the value of particular input fields 151).

The blacklist tool may selectively enable or disable processing of certain electronic forms or certain websites. Users may be able to add or remove forms and websites from the blacklist. In some embodiments, the user's blacklist may be synchronized with the backend server 105, and if enough users blacklist a particular form or website, the backend server 105 may automatically push these sites to other users' blacklists.

The Backend Server

As mentioned above, the backend server 105 may assist the FillBot application 130 in providing auto-fill capabilities to users 101. The backend server 105 and its components may be implemented as a dedicated server or using a cloud computing platform (e.g., Amazon Web Services (AWS), Microsoft Azure, or the like). The backend server 105 may also make use of one or more databases, for example, a document mapping database 175, a synonym mapping database 176, and a user data database 177. These databases may be implemented using any number of commercially available or open-source database technologies. In some embodiments, the databases may be implemented as document-oriented databases (e.g., using MongoDB, or the like) while in other embodiments they may be implemented as relational databases (e.g., using an Azure table, or the like). The particular manner of implementation may be selected based on desired performance characteristics of the FillBot system.

As illustrated in FIG. 1, the backend server 105 may include a FillBot API service component 170, a document mapping component 171, and a user data management component 172. The FillBot API service component 170 may provide a set of public facing (i.e., accessible via the Internet) services with which the FillBot application 130 may interact. The FillBot API service component 170, for example, may provide an endpoint that accepts document mappings 160 from the FillBot application 130, which may be passed along to the document mapping component 171 for storage and processing. The FillBot API service component 170 may also include endpoints that return user data to the FillBot application 130, which may be retrieved and/or generated by the user data management component 172. For example, the same endpoint that accepts the document mapping 160 may utilize user data management component 172 to return responsive user data, which may be selected based on the SlugIDs provided in the document mapping 160 as well as any synonyms identified from the synonym mapping database 176. The FillBot API service 170 may also provide an endpoint that allows the FillBot application 130 to request and receive a single user data value, for example, based on a specific SlugID and user ID provided by the FillBot application 130. The FillBot API service 170 may also include a set of endpoints that allow the user to save, update, and/or delete user data stored in user data database 177. The FillBot API service component 170, for example, may accept user data from the FillBot application 130, which may be passed along to the user data management component 172 for storage and processing.

As described above, the functionality provided by the endpoints of the FillBot API service component 170 may be enabled by the document mapping component 171 and user data management component 172. More particularly, the document mapping component 171 may store received document mappings 160 in document mapping database 175. The document mapping component 171 may also compare received document mappings 160 with those already stored in document mapping database 175 (e.g., based on a common form path 163) in order to determine whether changes have been made to a particular form. The document mapping component 171 may calculate a difference between the received and stored document mapping, and may update the stored mapping in the document mapping database 175 with that difference. The document mapping component 171, for example, may be able to detect when a company has added a new question (i.e., a new input field 151) to a job application hosted through its ATS, or changed the layout of a particular electronic form 150, and may update the stored document mapping to reflect these changes.

The user data management component 172, likewise, may store and process user data entered into electronic forms 150 that is received from user devices via the FillBot API service component 170. The user data management component 172, for instance, may store received user data in user data database 177 as SlugID and value pairs in association with a unique user ID that identifies the user 101 from whom the data was received. The user data management component 172 may implement logic to determine when and how data values are added or updated in the user data database 177. For example, in some embodiments, the user data management component 172 may store all received user data, which may allow for system fallback through data redundancy. Other embodiments may eliminate such redundancy when storing user data, but with the benefit of improved system responsiveness. In some embodiments, the user data management component 172 may also be able to detect when a user 101 has changed, or 'corrected,' the value of an input field 151 that was automatically populated. Adaptive techniques may be used to modify the relationship that led to the 'incorrect' auto-fill. The adaptive techniques may result in a global modification of the relationship or modifications on a per user basis. In the latter case, a separate cache of mappings specific to the user may be used to capture this.

The user data management component 172 may also process the user data to identify relationships between distinct input fields (i.e., between distinct SlugIDs). The resulting relationships may then be used by subsequent users in automatically populating an electronic form 150. For example, input fields 151 on different electronic forms 150 labeled "Mobile," "Cell," or "Personal Number" may all be requesting the same information (i.e., the user's telephone number). By examining the data entered by a user 101 into these input fields 151, the user data management component 172 may be able to identify a relationship (or create a mapping) there between. A user, for example, may enter "415-555-1212" in the "Mobile" input field 151 on a first electronic form 150 as well as in the "Cell" input field 151 on a second electronic form 150. Upon entry of the information in the second electronic form 150 (and transmission of the user data to backend server 105 for processing), the user data management component 172 may establish a relationship, or equivalence, between the "Mobile" and "Cell" input fields 151. As a result, subsequent users 101 who encounter either of these fields will have the same phone number auto-filled in each.

The user data management component 172 may also be responsible for returning stored user data to the FillBot application 130, for example, in a response provided by the FillBot API service 170 (e.g., in response to the invocation of an HTTP POST method providing a document mapping 160). In some embodiments, the user data management component 172 may return all user data stored in user data database 177. However, in other embodiments, it may be desirable to return only a portion of the stored user data (e.g., where the user's data set is quite large and/or the available communication bandwidth is limited). In such cases, the user data management component 172 may only return the relevant user information needed to auto-fill a particular electronic form 150, which may be selected based on the document mapping 160 first provided by the user 101 (i.e., based on the SlugIDs in the document mapping 160).

In some embodiments, the user data management component 172 may be capable of interfacing with external sources to help initialize the user data database 177, potentially eliminating the need for users 101 to manually enter any information at all. The user data management component 172, for example, may be able to process a resume uploaded by the user 101, interface with a human resource information system, or access a credit report database to obtain information to be entered in the user data database 177. In some embodiments, the user data database 177 may be initialized by ingesting and processing existing electronic forms 150. For example, corporate web servers 103 may provide a resume builder service, which may generate a structured document containing user entered data for particular fields. As discussed above, the FillBot application 130 may permit a user to ingest this existing electronic form 150, and may generate a document mapping 160 and capture user entered data, which may then be transmitted to the backend server 105 via the backend communication component 132. In other embodiments, the backend server 105 may include a form parsing engine similar to that of the FillBot application described above, which likewise may be capable of scanning an electronic form 150 and generating the document mapping 160. In such cases, the electronic form 150 may be ingested from an existing storage location or database of the backend server 105, or otherwise accessible by the backend server 105 (e.g., through a shared database). It may also be the case that the backend communication component 132 of the FillBot application 130 may transmit the existing electronic form 150 to the backend server 105, which may process the electronic form 150 and generate a document mapping 160 and capture corresponding user entered data.

Generating the Document Mapping

As discussed above, the form parsing engine 131 may be responsible for generating a document mapping 160 containing a listing of all the information being requested in the electronic form 150. In order to accurately perform auto-fill it is important to correctly identify what information is called for in each field 151 of an electronic form 150 and how that information is to be entered. But there are countless numbers of electronic form structures (e.g., a date can be entered into a text field or selected from a series of drop-down lists) and equally varied manners of implementing a particular structure (i.e., in HTML code or the like), making it difficult to automate this identification process. The electronic forms 150 illustrated in FIG. 1, for example, depict how an electronic form 150 may be rendered on a user device. Although a correspondence between a label 152 and field 151 may be readily apparent upon visual inspection of the electronic form 150, the relationship is not always clearly established in the underlying code or document object model (DOM) (i.e., a tree-like structure generated by the layout engine of a web browser in rendering the HTML code). In fact, there are countless ways in which a visually identical electronic form 150 may be represented in the underlying code or DOM.

In contrast to existing auto-fill solutions which can only handle a limited number of simplistic scenarios (e.g., where a label and form control are explicitly linked in the underlying HTML), the FillBot application 130 utilizes a flexible code design to accommodate the various form structures that can be expected in the underlying code and\or DOM. For example, in some instances, an input element may be placed within a label element, but not explicitly linked to the label element. In such cases, the form parsing engine 131 may look at the parent element of the input element in the DOM to see if it is a label type element. In other instances, the input element may be a select element (i.e., a dropdown list). In such cases, the form parsing engine 131 may treat the default option as the label since this is what will be visible to the user when the form is rendered.

In yet other instances, the label element, due to the layout structure of the form, may be several levels away from the input element with which it is associated (i.e., not logically 'near' the input element in the DOM) but under the same 'root' node. In such cases, the form parsing engine 131 may traverse up the DOM level by level and check at each level whether a particular branch contains any text that looks like valid input label text. However, some electronic forms may employ a hierarchical structure in which branches containing label elements and input elements share the same 'root' node, and consequently are all siblings of one another. Traversing up the DOM, as previously suggested, would not be effective in such cases. To account for this scenario, the form parsing engine 131 may first make a determination of whether the node is a 'shared' node. If so, it would move from the branch containing the input element in question, to the prior (or successive) sibling branch and check to see whether the sibling branch contains any text that looks like valid input label text. The process would continue by moving to another sibling branch until a valid input label is found.

The form processing engine 131 can also deal with electronic forms that are dynamic in nature, for example where input elements are dynamically added or removed (e.g., using JavaScript) depending on certain user actions. In such cases, the form processing engine 131 examines all possible DOM mutations and processes them accordingly.

Managing User Data & Identifying Input Relationships

Figure 2:
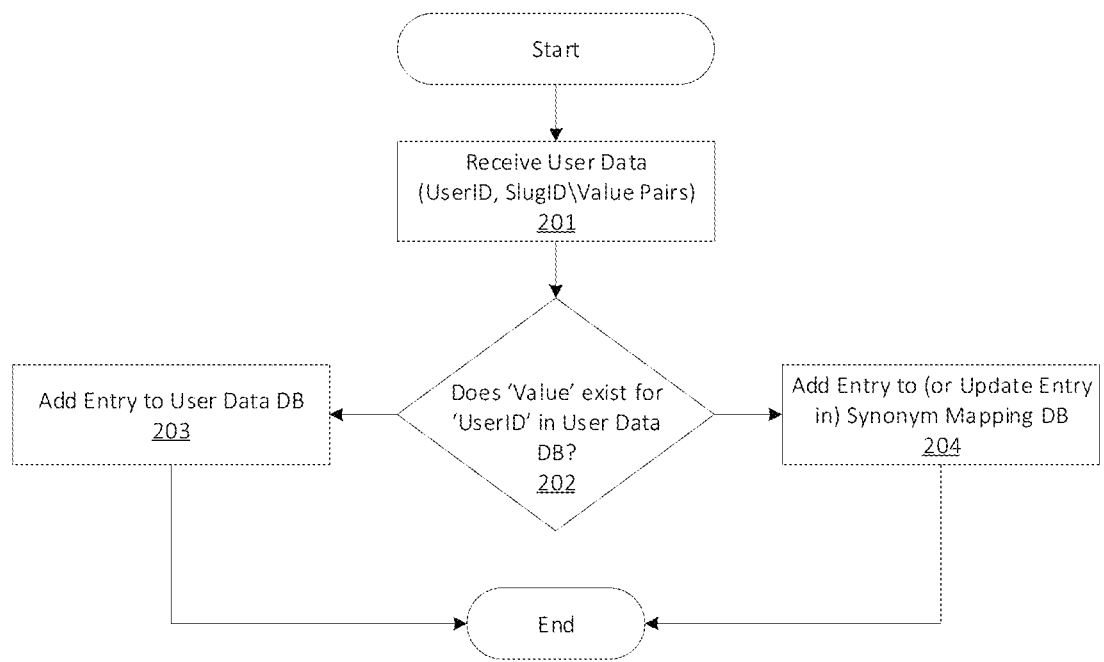
FIG. 2 depicts an exemplary logic flow that a user data management component may employ when adding or updating user data in a user data database.

As discussed above, the user data management component 172 may store user data received from user devices via the FillBot API service component 170, and may process the user data to identify relationships between different input fields 151. FIG. 2 depicts an exemplary logic flow that the user data management component 172 may employ when adding or updating user data in user data database 177. The process may begin upon receipt of user data from the FillBot API service component 170 (201). As described above, the user data may include a unique user ID and one or more SlugID and value pairs corresponding to the data entered into electronic form 150 upon submission. For each SlugID and value pair, a determination is made whether the value exists for the user in the user data database 177 (202). If no match is found (i.e., the user has not previously entered the value in any form), the user data database 177 is updated to include an entry for the SlugID and value pair for the user (203). Alternatively, if a match is found and the received SlugID is different than the SlugID corresponding to the value already stored in the user data database 177 (i.e., the user has entered the same value in the current form as they had in a previous form), the synonym mapping database 176 may be updated by adding a mapping between the received SlugID and the previously stored SlugID. In some embodiments, the user data management 172 may also include a 'count' field in the synonym mapping database 176, indicating the number of times a particular mapping has been established by different users. In such embodiments, the synonym mapping database 176 may be updated either by adding a mapping between the received SlugID and the previously stored SlugID or by incrementing the 'count' of such a mapping if it already exists (i.e., where the mapping was previously established by a different user) (204). The 'count' field may then be used to ensure the accuracy of an established mapping, for example, representing a correct mapping where 'count' is greater than or equal to a threshold value. The above-described process has the benefits of eliminating redundancy in the user data database 177 and quickly establishing relationships between SlugIDs (i.e., as soon as a single user enters the same value in two different input fields 151 on two different electronic forms 150).

Figure 3:
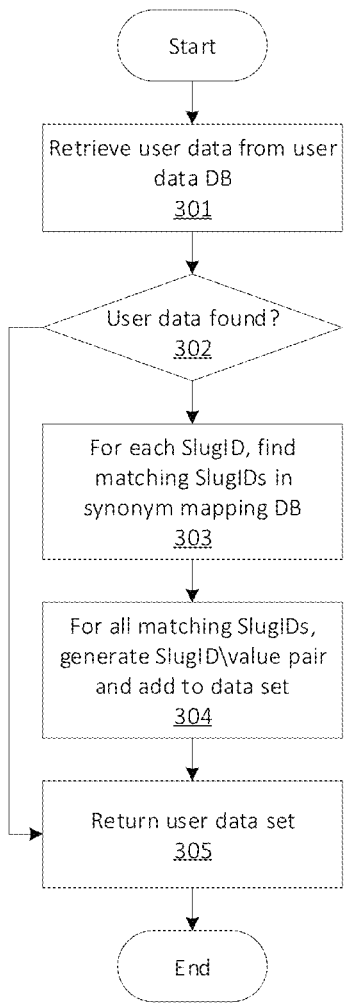
FIG. 3 depicts an exemplary logic flow that a user data management component may employ when returning user data stored in user data database.

FIG. 3 depicts an exemplary logic flow that the user data management component 172 may employ when returning user data stored in user data database 177. The process may begin by retrieving user data for a particular user 101 stored in user data database 177 (301), and checking to see whether any user data exists (302). If no user data is retrieved, a null response set is provided, and the user 101 will need to manually enter information into the electronic form 150 that they are attempting to complete (305). Alternatively, if user data is found, the user data management component 172 identifies all mapped SlugIDs in the synonym mapping database 176 for each SlugID in the retrieved user data (303). In embodiments where a 'count' field is utilized, the identification of mapped SlugIDs may be limited to those where the 'count' field exceeds a threshold value. The user data management component 172, in turn, may generate SlugID and value pairs for the matching SlugIDs, and return the complete set of retrieved and generated user data (304, 305). In some embodiments, the set that is returned to the FillBot application 130 may be filtered or otherwise reduced to only those that are needed to auto-fill a particular electronic form 150. For example, as suggested above, the user data management component 172 may filter the set of retrieved and generated user data based on the SlugIDs included in a document mapping 160 provided by the FillBot application 130 (i.e., returning only those values required for the electronic form 150 from which the document mapping 160 was generated). In this way, the amount of user data sent to a user device is minimized, as is the amount of bandwidth utilized.

The identification of matching SlugIDs in the synonym mapping database 176 may also be aided through the use of an in memory cache, which may map all possible slugs for a given SlugID based on the identified relationships stored in the synonym mapping database 176. The user data management component 172 may be configured to update the slug cache at set intervals (e.g., every 'n' minutes), and by utilizing the slug cache, the number of database calls that is required to provide responsive user data is reduced (i.e., the only database call that is required is to the user data database 177), improving system responsiveness and reducing computational demand.

Overall System Operation

Figure 4:
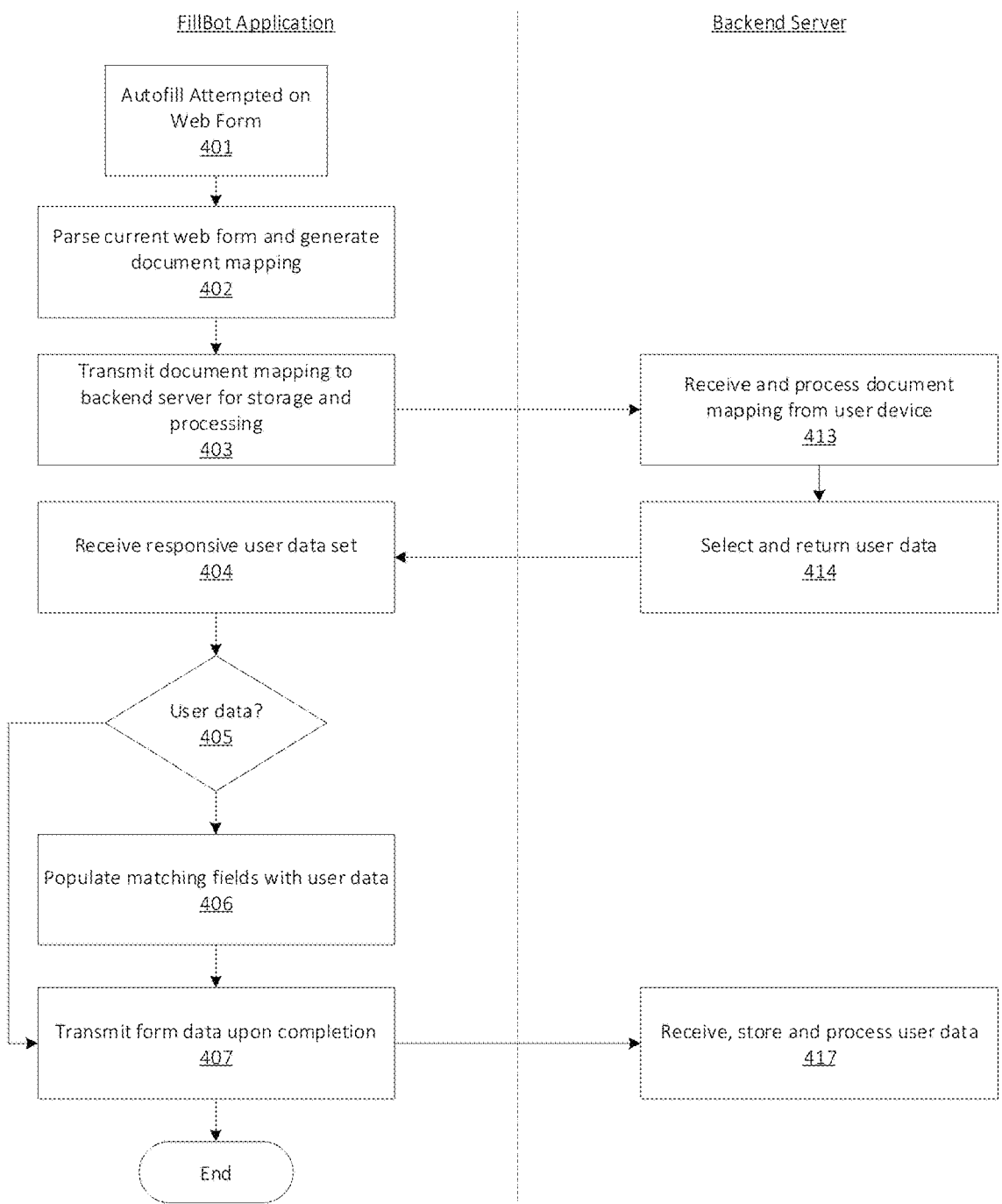
FIG. 4 depicts a high-level logic flow that the FillBot application and backend server may follow in providing auto-fill functionality to users.

FIG. 4 depicts a high-level logic flow that the FillBot application 130 and backend server 105 may follow in providing auto-fill functionality to users 101. The process may begin when a user 101 visits a website hosting an electronic form 150 and attempts to auto-fill the electronic form 150 using the FillBot application 130 (401). The form processing engine 131 of the FillBot application may then parse the electronic form 150 and generate a document mapping 160 (402), which may be sent to the backend server 105 for storage and processing using backend communication component 132 (403). The backend server 105 may receive and process the document mapping 160 using the document mapping component 171 (413), and in response, may select and return user data from user data database 177 using user data management component 172 (414). The FillBot application 130 may receive the responsive user data set from the backend server 105 (404), and then inspect the response to determine whether any user data is present (405). If no user data is present (i.e., a null response set is received), the user 101 must manually complete electronic form 150. Alternatively, the FillBot application 130 may use the user data in the responsive user data set to populate one or more corresponding input fields 151 in the electronic form 150 (406). In some cases, the FillBot application 130 may not be able to populate all input fields 152, and the user may manually fill any empty input fields 152. Upon completion of the electronic form 150, the FillBot application 130 may capture the form data using data capture component 134 and transmit the captured data to backend server 105 using backend communication component 132 (407). The backend server 105 may receive the captured data through the FillBot API service component 170, and store and process the captured data using user data management component 172, which may result in the identification of related SlugIDs which are then stored in synonym mapping database 176 (408).

An Illustrative Example

Figure 5:
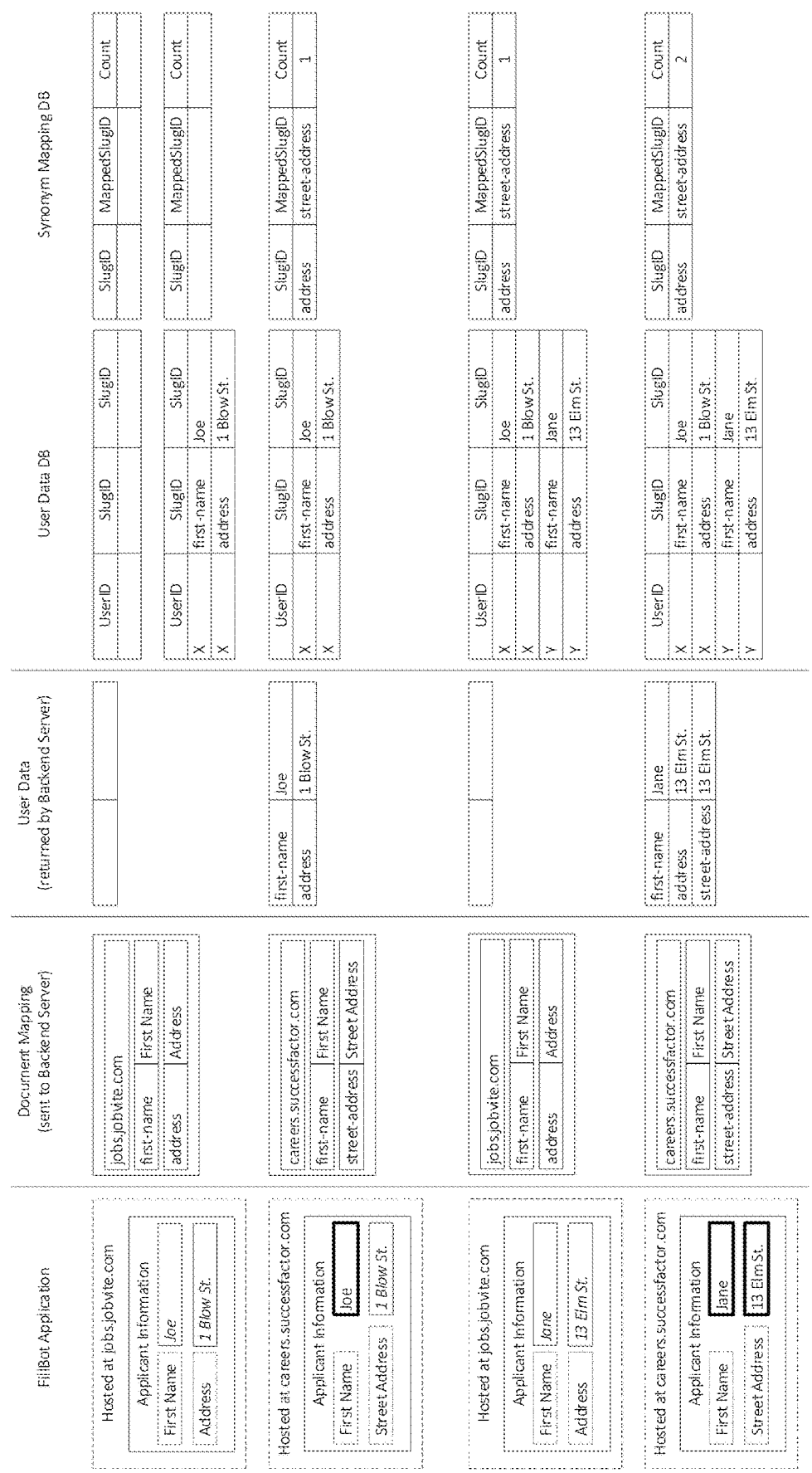
FIG. 5 provides an illustrative example of the operation of the FillBot system.

FIG. 5 provides an illustrative example of the operation of the FillBot system applying the logical flows of FIGS. 2-3 described above. As illustrated, the process may begin when a user (i.e., User X) first accesses an electronic form on a first website (e.g., a job application hosted at jobs.jobvite.com). The FillBot application 130 may be initiated, either automatically upon detection of the electronic form or based on a user input (e.g., by pressing an auto-fill icon), and the form parsing engine 131 may generate a document mapping ('jobs.jobvite.com', 'first-name, First Name', 'address, Address') based on the electronic form. The backend communication component 132 may then transmit the document mapping to backend server 105 for storage and processing. The user data management component 172 may then attempt to retrieve user data from the user data database to return in response, but since the user data database does not yet contain any entries for the user (i.e., for User X), a null set will be returned. Since no data was returned, none of the fields of the electronic form will be populated, and the user may proceed to complete the electronic form, for example, entering values (i.e., 'Joe' and '1 Blow St.') into the electronic form's input fields (i.e., the fields labeled 'First Name' and 'Address'). This form data is then captured using data capture component 134 and sent to backend server 105, which adds corresponding entries to the user data database (i.e., adding 'X, first-name, Joe' and 'X, address, 1 Blow St.').

The same user (i.e., User X) may then access an electronic form on a second website (e.g., a job application hosted at careers.successfactor.com). The FillBot application 130 may again be initiated, and the form parsing engine 131 may generate a document mapping ('careers.successfactor.com', 'first-name, First Name', 'street-address, Street Address') based on the electronic form. The backend communication component 132 may then transmit the document mapping to backend server 105 for storage and processing. The user data management component 172 may then retrieve user data for the user (i.e., 'first-name, Joe' and 'address, 1 Blow St.') from the user data database to return in response. Since no relationships are established in the synonym mapping database, no additional SlugID\value pairs are generated, and the retrieved user data is returned to the FillBot application 130. The populate field component 133 uses the returned user data to populate the input fields of the electronic form (i.e., entering 'Joe' into the field labeled 'First-Name'). Because the populate field component 133 is unable to populate all fields of the electronic form, the user may proceed to complete the electronic form, for example, entering values (i.e., '1 Blow St.') into the unfilled input fields (i.e., the field labeled 'Street Address'). The form data is then captured using data capture component 134 and sent to backend server 105, which adds an entry to the synonym mapping database (i.e., adding 'address, street-address, 1').

Another user (i.e., User Y) may then access the electronic form on the first website and the FillBot application 130 may be initiated. The form parsing engine 131 may generate a document mapping ('jobs.jobvite.com', 'first-name, First Name', 'address, Address') based on the electronic form, which may be sent to backend server 105 for storage and processing. The user data management component 172 may then attempt to retrieve user data from the user data database to return in response, but since the user data database does not yet contain any entries for the user (i.e., for User Y), a null set will be returned. Since no data was returned, none of the fields of the electronic form will be populated, and the user may proceed to complete the electronic form, for example, entering values (i.e., 'Jane' and '13 Elm St.') into the electronic form's input fields (i.e., the fields labeled 'First Name' and 'Address'). This form data is then captured using data capture component 134 and sent to backend server 105, which adds corresponding entries to the user data database (i.e., adding 'Y, first-name, Jane' and 'Y, address, 13 Elm St.').

The same user (i.e., User Y) may then access the electronic form on the second website, and the FillBot application 130 may again be initiated. The form parsing engine 131 may generate a document mapping ('careers.successfactor.com', 'first-name, First Name', 'street-address, Street Address') based on the electronic form, which may be transmitted to backend server 105 for storage and processing. The user data management component 172 may then retrieve user data for the user (i.e., 'first-name, Jane' and 'address, 13 Elm St.') from the user data database to return in response. Because there is a match between the SlugID in the retrieved user data and the synonym mapping database, user data management component 172 may generate an additional SlugID and value pair (i.e., 'street-address, 13 Elm St.'), and the retrieved user data and generated user data (i.e., 'first-name, Jane', 'address, 13 Elm St.', and 'street-address, 13 Elm St.') may be returned to the FillBot application 130. The populate field component 133 uses the returned user data to populate all of the input fields of the electronic form (i.e., entering 'Jane' and '13 Elm St.' into the fields labeled 'First-Name' and 'Street Address' respectively). The user may validate that the information is correct and then submit the electronic form. The form data is then captured using data capture component 134 and sent to backend server 105, which increments the count of the relied upon relationship in the synonym mapping database 176 (i.e., changing the entry to 'address, street-address, 2').

Figure 6:
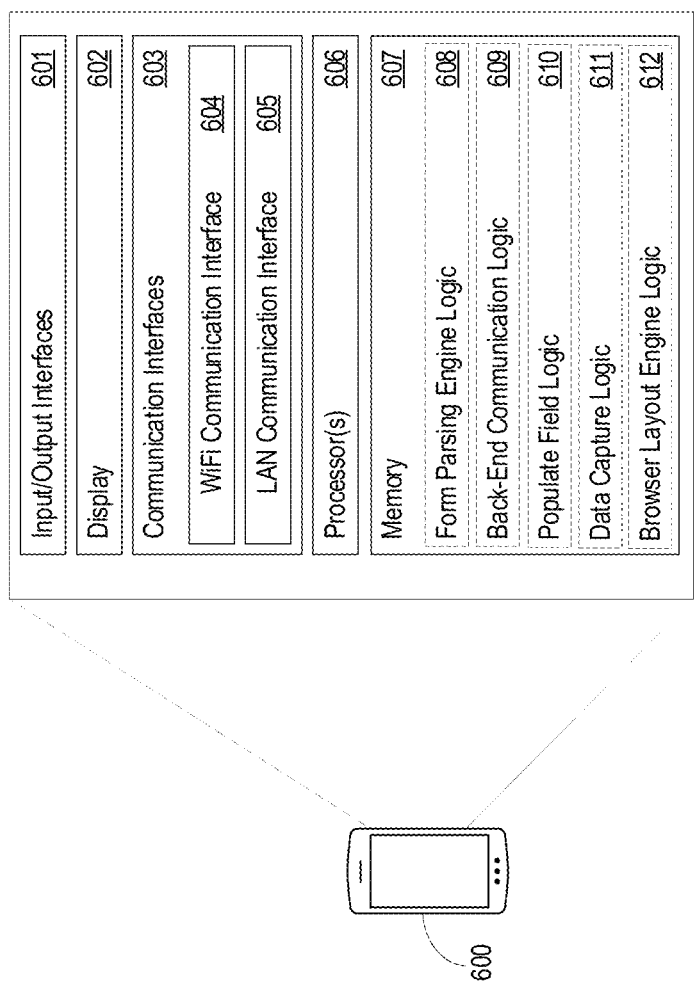
FIG. 6 is a schematic block diagram of a user device according to an exemplary embodiment of the FillBot system.

FIG. 6 illustrates a schematic block diagram of a user device (e.g., mobile phone 110 or personal computer 120) according to an exemplary embodiment of the FillBot system. As illustrated, the device 600 may include a processor 606 in communication with a memory 607 and one or more input/output interfaces 601 (e.g., a keyboard, touchscreen, etc.), displays 602 (e.g., an LCD display, LED display, etc.), and one or more communication interfaces 603 (e.g., WiFi communication interface 604, LAN communication interface 605, etc.). The processor 606 may take the form of one or more CPUs, controllers, digital signal processors (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. The processor 606 may be configured to execute instructions stored on memory 607 or otherwise available to the processor 606. The memory 607 may take the form of an electronic storage device (e.g., a computer readable storage medium) comprising gates configured to store data, which may be retrievable by a processor 606. The memory device 607 may comprise a non-transitory tangible memory device, and may be configured to store information, data, files, applications, instructions or the like for enabling the apparatus to carry out various functions in accordance with an example embodiment of the invention. For example, the memory device 607 could be configured to buffer input data for processing by the processor 606. Additionally or alternatively, the memory device 607 could be configured to store instructions for execution by the processor 606. For example, the memory 607 may comprise form parsing engine logic 608, back-end communication logic 609, populate field logic 610, data capture logic 611 and browser layout engine logic 612 which may be used or executed by the processor 606 in providing the functionality provided in this disclosure. In yet other embodiments, the memory device 606 may be one of a plurality of databases that store information.

Figure 7:
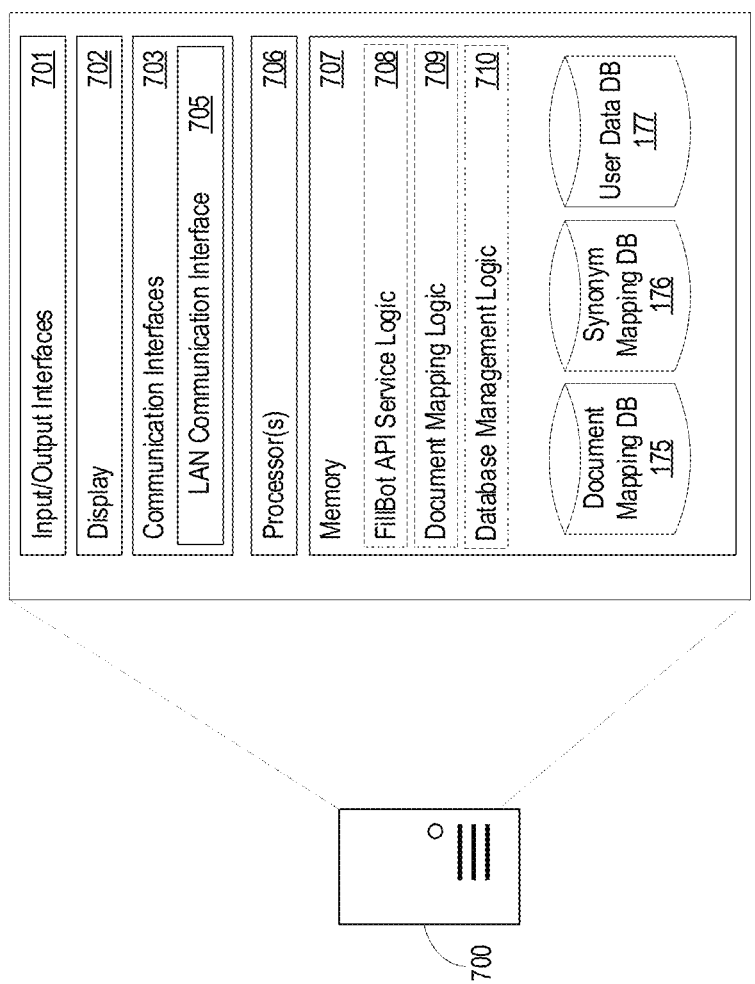
FIG. 7 is a schematic block diagram of a back-end server according to an exemplary embodiment of the FillBot system.

FIG. 7 illustrates a schematic block diagram of a back-end server according to an exemplary embodiment of the FillBot system. As illustrated the device 700 may include one or more processors 706 in communication with a memory 707 and one or more input/output interfaces 701 (e.g., a keyboard, touchscreen, etc.), displays 702 (e.g., an LCD display, LED display, etc.), and communication interfaces 703 (e.g., LAN communication interface 705, etc.). While illustrated as a physical device 700, in other embodiments, the back-end server may be virtualized in some manner, such that it may be deployed on a cloud computing platform (e.g., Amazon Web Services (AWS), Microsoft Azure, or the like).

The processor 706 may take the form of one or more CPUs, controllers, digital signal processors (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. The processor 706 may be configured to execute instructions stored on memory 707 or otherwise available to the processor 706.

Meanwhile, the memory 707 may take the form of an electronic storage device (e.g., a computer readable storage medium) comprising gates configured to store data, which may be retrievable by a processor 706. The memory device 707 may comprise a non-transitory tangible memory device, and may be configured to store information, data, files, applications, instructions or the like for enabling the apparatus to carry out various functions in accordance with an example embodiment of the invention. For example, the memory device 707 could be configured to buffer input data for processing by the processor 706. Additionally or alternatively, the memory device 707 could be configured to store instructions for execution by the processor 706. For example, the memory 707 may comprise web server logic, FillBot API service logic 708, document mapping logic 709, and database management logic 710 which may be used or executed by the processor 706 in providing the functionality provided in this disclosure. Additionally, or in the alternative, the memory device 706 may be one of a plurality of databases that store information. For example, the memory 707 may comprise document mapping database 175, synonym mapping database 176, and/or user data database 177, which may be accessed by the processor 706 using database management logic 710.

While specific embodiments of the invention have been described above, it will be appreciated that the invention may be practiced other than as described. The description provided above is intended to be illustrative and non-limiting. Thus, it will be apparent to one skilled in the art that modifications may be made to the present invention as described without departing from the scope of the claims set out below. It is also worth noting that the Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
presenting a user with an electronic form comprising one or more input fields, each input field having one or more field attributes;
parsing the electronic form to generate a form mapping, the form mapping comprising:
a form path identifier identifying an address from where the electronic form originated; and
a listing of all input fields within the electronic form, wherein each input field comprises a local field identifier, a field label, and a field type;
comparing the form path identifier with a blacklist of addresses to determine whether parsing the electronic form should be initiated, wherein initiating parsing of the electronic form is declined based on the form path identifier being contained in the blacklist of addresses;
assigning a global field identifier to each input field in the form mapping based on field attributes of the input field, wherein each global field identifier is a unique value;
transmitting the form mapping to a remote server before entry of user data by a user;
storing the form mapping at the remote server in association with the form path identifier, wherein the form mapping stores the global field identifier in association with each input field of the electronic form;
receiving user data from the remote server in response to the form mapping; and
automatically populating the electronic form with the user data.

2. The method of claim 1 wherein the one or more field attributes include a field value attribute, and wherein the method further comprises:
receiving user entered data through the field value attribute of one or more fields; and
transmitting the user entered data to the remote server.

3. The method of claim 2 wherein receiving and transmitting the user entered values occurs after automatically populating the electronic form with the user data.

4. The method of claim 1 wherein a document object model is utilized to parse the electronic form and automatically populate the electronic form.

5. The method of claim 1, wherein parsing the electronic form comprises inspecting a document object model (DOM) of the electronic form to identify a correspondence between each input field and a respective field label of the electronic form.

6. The method of claim 5, wherein inspecting the DOM comprises traversing each level of a branch of a hierarchy of the DOM on which each input field is held to locate corresponding input label text.

7. The method of claim 5, wherein inspecting the DOM comprises:
determining that an input field of the one or more input fields of the electronic form is in a share node of the DOM; and
traversing adjacent sibling branches of the DOM to identify corresponding input label text.

8. The method of claim 1, wherein, when a relationship between a first local field identifier and a first input field is unclear, a parent field identifier of the first input field in a document object model (DOM) is utilized as the first local field identifier.

9. The method of claim 1, wherein respective unique field identifiers, corresponding to multiple input fields having a same field label and a same field type, have sequential numbers appended thereto.

10. A user device comprising:
at least one processor; and
a memory in communication with the processor, the memory having a plurality of instructions stored thereon,
where the processor is configured to execute the instructions to:

present a user with an electronic form comprising one or more input fields, each input field having one or more field attributes;

parse the electronic form to generate a form mapping, the form mapping comprising:
- a form path identifier identifying an address from where the electronic form originated; and
- a listing of all input fields within the electronic form, wherein each input field comprises a local field identifier, a field label, and a field type;

compare the form path identifier with a blacklist to determine whether parsing the electronic form should be initiated, wherein initiating parsing of the electronic form is declined based on the form path identifier being contained in the blacklist of addresses;

assign a global field identifier to each input field in the form mapping based on field attributes of the input field, wherein each global identifier is a unique value;

transmit the form mapping to a remote server before entry of user data by the user;

store the form mapping at the remote server in association with the form path identifier in a form mapping database, wherein the form mapping stores each global field identifier in association with a corresponding input field from the electronic form;

receive user data from the remote server in response; and automatically populate the electronic form with the user data.

11. The user device of claim 10, wherein the processor is configured to execute the instructions further to:

receive user entered data through the one or more field attributes of the one or more input fields; and transmit the user entered data to the remote server.

12. The user device of claim 11 wherein the processor is configured to execute the instructions to receive and transmit the user entered values after the electronic form has been automatically populated with the user data.

13. The user device of claim 10 wherein, if a relationship between a first local field identifier and a first input field is unclear, a parent field identifier of the first input field in a document object model is utilized as the first local field identifier.

14. The user device of claim 10, wherein the instructions to parse the electronic form further comprise instructions to be executed by the processor to inspect a document object model (DOM) of the electronic form to identify a correspondence between each input field and a respective field label of the electronic form.

15. The user device of claim 14, wherein the instructions to inspect the DOM further comprise instructions configured to be executed by the processor to traverse each level of a branch of a hierarchy of the DOM on which each input field is held to locate corresponding input label text.

16. The user device of claim 14, wherein the instructions to inspect the DOM further comprise instructions configured to be executed by the processor to:
- determine that an input field of the one or more input fields of the electronic form is in a share node of the DOM; and
- traverse adjacent sibling branches of the DOM to identify corresponding input label text.

17. The user device of claim 10, wherein respective unique field identifiers, corresponding to multiple input fields having a same field label and a same field type, have sequential numbers appended thereto.

* * * * *